United States Patent [19]

Brierley

[11] Patent Number: 5,150,172

[45] Date of Patent: * Sep. 22, 1992

[54] INTERFEROMETER SPECTROMETER HAVING TILTABLE REFLECTOR ASSEMBLY AND REFLECTOR ASSEMBLY THEREFOR

[75] Inventor: Philip R. Brierley, Madison, Wis.

[73] Assignee: Nicolet Instrument Corporation, Madison, Wis.

[*] Notice: The portion of the term of this patent subsequent to Apr. 10, 2007 has been disclaimed.

[21] Appl. No.: 715,705

[22] Filed: May 17, 1991

Related U.S. Application Data

[63] Continuation of Ser. No. 435,184, Nov. 13, 1989, abandoned, which is a continuation of Ser. No. 142,142, Jan. 11, 1988, Pat. No. 4,915,502.

[51] Int. Cl.$^5$ .............................................. G01B 9/02
[52] U.S. Cl. .................................................... 356/346
[58] Field of Search ........................................ 356/346

[56] References Cited

U.S. PATENT DOCUMENTS

| 3,782,826 | 1/1974 | Offutt. | |
|---|---|---|---|
| 4,329,055 | 5/1982 | Schaefer et al. | |
| 4,355,394 | 10/1982 | Schaefer et al. | |
| 4,654,530 | 3/1987 | Dybwad. | |
| 4,681,445 | 7/1987 | Perkins | 356/346 |
| 4,915,502 | 4/1990 | Brierley | 356/346 |

FOREIGN PATENT DOCUMENTS

| 2906015 | 8/1979 | Fed. Rep. of Germany. |
| 2900899 | 7/1980 | Fed. Rep. of Germany. |
| 2014754 | 8/1976 | United Kingdom. |
| 2171536 | 8/1986 | United Kingdom. |

OTHER PUBLICATIONS

Griffiths and De Haseth, "Fourier Transform Infrared Spectrometry," (book) John Wiley & Sons, NY, 1986, pp. 121-142.
Jasny, J., et al., "Novel Method for active Mode-Locking and Tuning of Dye Lasers", Optics Communications, vol. 27, No. 3, Dec. 1978, pp. 426-430.
Marinero, E. E. and Jasny, J., "An Interferometrically Tuned and Actively Mode Locked CW Dye Laser", Optics Communications, vol. 36, No. 1, Jan. 1981, pp. 69-74.
Docchio, F. et al., "A Wavelength Meter Based on a Rotating Parallelepiped Interferometer", J. Phys. E: Sci. Instrum. (GB), vol. 18, No. 10, 1985, pp. 849-853.
R. S. Sternberg et al., "A New Type of Michelson Interference Spectrometer," J. Sci. Instrum., 1964, vol. 41, pp. 225-226.

Primary Examiner—Samuel A. Turner

[57] ABSTRACT

A twin-arm interferometer spectrometer having a tiltable reflector assembly, which includes a pair of mutually facing parallel reflective elements, varies the path length of both interferometer arms simultaneously to achieve high resolution in a small, low maintenance design. Collimated electromagnetic radiation is split by a beamsplitter into first and second arm beams. Both arm beams impinge on the tiltable reflector assembly, to retroreflectors, and back to the beamsplitter wherein they recombine to form an exit beam. The exit beam is directed to a sample and then to a suitable detector. Modulation of the exit beam is produced by tilting the reflector assembly about an axis parallel to the reflective elements in the reflector assembly. This tilting causes a simultaneous variation in the path length of both interferometer arms, and thereby yields a large total path difference with a relatively small movement. Symmetry between the paths of the reference beam and test beam results in greater stability and greater immunity to thermal expansion.

4 Claims, 3 Drawing Sheets

INTERFEROMETER SPECTROMETER HAVING TILTABLE REFLECTOR ASSEMBLY AND REFLECTOR ASSEMBLY THEREFOR

This is a continuation of application Ser. No. 07/435,184 filed Nov. 13, 1989, now abandoned, which is a continuation of Ser. No. 07/142,142, filed Jan. 11, 1988, now U.S. Pat. No. 4,915,502.

The invention relates to interferometer spectrometers and, in particular, to twin-arm interferometer spectrometers which use tiltable reflective elements to vary the optical path difference in the device.

BACKGROUND OF THE INVENTION

Twin-arm interferometer spectrometers are known to prior art. The Michelson interferometer spectrometer is a representative example. An incident beam of analytical radiation, such as collimated infrared radiation, strikes a beamsplitter and is split into two separate beams, each of which travels down a different optical path or "arm" of the interferometer. One of the beams, known as the reference beam, is directed along a reference path having a fixed optical length while the other beam, known as the test beam, is directed along a test path having a variable optical length. Retroreflecting elements, such as plane mirrors or corner-cubes, return the two beams to the beamsplitter wherein the beams recombine to form a single exit beam. The exit beam is then directed to a sample and thereafter to a suitable radiation detector. The exit beam is then modulated, by varying the optical path length in the test beam, and the detected radiation is converted into a signal which is then analyzed in a known way to determine certain characteristics, such as the spectrum, of the sample. In other designs the sample may be placed in the incident beam or in the test beam, but the same operating principles apply. Other characteristics of the sample, such as its thickness or index of refraction, may also be determined from this basic apparatus.

Because the design relies on the wave interference between the two arm beams of the device, an important factor in determining the quality of this type of interferometer is the degree to which the optical elements in the test arm remain aligned with the optical elements in the reference arm during variation of the path length of the test beam. In most designs, the optical length of the test beam is varied by displacing the retroreflecting element, commonly referred to as the moving mirror, in the test arm longitudinally along the optical axis of the test beam. The maximum resolution attainable with the device is directly related to the maximum path difference, i.e. the maximum longitudinal displacement, that is attained by the displaced retroreflecting element.

Unfortunately, the longitudinal displacement of the moving mirror must be extremely accurate over the entire range of its travel. In most cases, the moving mirror must remain aligned to within a small fraction of the wavelength of light over a longitudinal movement of several centimeters. To achieve this high accuracy over such a long travel, modern high-speed scanning interferometers usually use precision air bearings to support the mirror while complicated electronic control systems insure that the mirror orientation is held constant. Unfortunately, precision air bearings are quite expensive, relatively large, and require a supply of pressurized gas in order to operate. In addition, electronic control systems are difficult to design and may also be relatively large and expensive. Other precision bearings and control circuits have similar drawbacks.

Numerous efforts have been made to avoid the need for precision bearings and electronic alignment control. One approach is to use a tiltable reflector assembly, rather than a longitudinally displaced retroreflector, in the test arm of the interferometer. The tilting reflector assembly consists of a pair of parallel, mutually facing mirrors which, when rotated through an angle, produces a variation in the optical length of a test beam reflecting between them. An example of this is shown in British Patent Application 2,171,536A. Another example is shown by Sternberg and James, *J. Sci. Instrum.*, 41, 225–6, 1964.

Designs such as these, which use tiltable reflector assemblies in the test arm to vary the optical path length, have the advantage that they are insensitive to linear movement of the optical elements. Instead, the optical elements are arranged so that only angular displacements of the assembly will change the path length of the test arm. Because longitudinal displacement of the assembly will not alter the path length of the arm, and because rotating bearings are generally easier and less expensive to produce than longitudinal or linear bearings, tiltable reflector assemblies have generally been found to be more stable than other moving mirror designs.

In spite of this, they have been largely ignored by the industrial community, for reasons not known to the inventor. In part, it is believed due to the fact that tilting reflector assemblies require larger, more expensive optical elements than do longitudinal scanning designs because rotating the elements lessens their effective diameter. Also, it is perhaps partly due to a belief that tiltable reflector assemblies are unable to deliver high resolution, because high resolution requires large rotation angles, in order to give a large path difference, and large rotation angles may cause vignetting of the radiation beam. Efforts to attain high resolution using a larger beam diameter are also difficult because increasing the beam diameter by even small amounts requires increasing the size of the associated optical elements by large amounts.

SUMMARY OF THE INVENTION

In accordance with the present invention a twin-arm interferometer spectrometer is disclosed having a tiltable reflector assembly for varying the path difference of the interferometer. The invention departs from prior art interferometers by having a tiltable reflector assembly which varies the optical path length of both interferometer arms simultaneously. In so doing, a desired total path difference may be achieved by a much smaller rotation of the paired mirrors. Thus, a given total path difference may be obtained with optical elements that are smaller in diameter than those used on previous tiltable reflector designs and, in addition, the resolution is greater because the total path difference that may be obtained is larger than that which is available from previous tiltable reflector designs. Further advantages are that the optical system is symmetrical, which results in a more stable optical configuration than is achieved with single arm designs, and that misalignment caused by thermal expansion is minimized. Also, the optical system is small and compact and maintains excellent accuracy over very long periods of sustained use, without requiring a supply of pressurized air in order to function. The interferometer is therefore well suited to situations where the spectrometer must operate unattended for long periods of time.

Additional objects, features, and advantages of the invention will be apparent from the following detailed description when taken in conjunction with the accompanying drawings.

DETAILED DESCRIPTION OF THE PREFERRED EMBODIMENT

Figure 1:
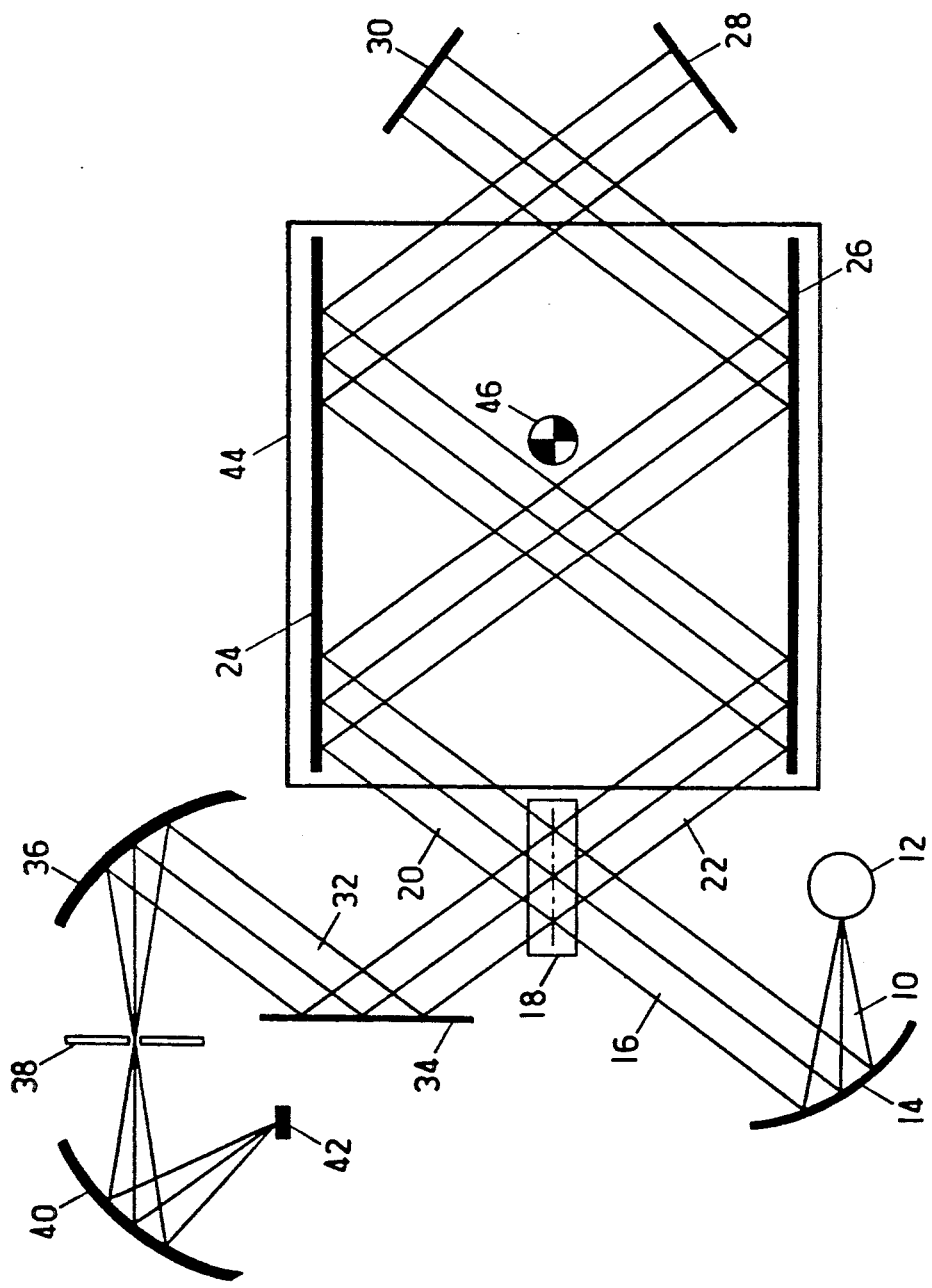
FIG. 1 is a plan view of the present invention.

With reference to FIG. 1, analytical radiation 10 from a source 12 is directed to a collimating element 14, which collimates the beam 10 to produce input beam 16. Collimating element 14 may comprise a variety of optical elements known to the art, but as most radiation sources resemble point sources, it is preferred that element 14 comprises an off-axis paraboloid. Input beam 16 is then directed to a beamsplitter 18 which splits the input beam 16 into separate arm beams 20 and 22. Arm beams 20 and 22 roughly correspond to the reference and test beams of the standard Michelson-type interferometer, although differ from the standard design due to the obvious symmetry of the present design. In the preferred embodiment, input beam 16 has a diameter of about 1 inch, with the other optical elements sized accordingly, but those in the art will appreciate that the size of the elements may be adjusted over a wide range without departing from the scope of the invention.

Arm beams 20 and 22 impinge on reflecting elements 24 and 26, which preferably comprise parallel plane mirrors, and then preferably reflect back and forth between the mirrors, as suggested by FIG. 1, until they finally exit the region between the elements 24 and 26 and impinge on retroreflecting elements 28 and 30. Retroreflecting elements 28 and 30 preferably comprise plane mirrors, but alternatively may comprise cornercubes known to the art.

After striking retroreflecting elements 28 and 30, radiation from arm beams 20 and 22 is reflected back into the region between the elements 24 and 26, with each arm beam 20 and 22 returning along the same path it took from the beamsplitter 18. Thus, radiation from arm beams 20 and 22 will return to beamsplitter 18 and will recombine therein to form exit beam 32. Exit beam 32 is then directed to a transfer element 34 which directs the exit beam 32 to a focusing element 36. Focusing element 36 focuses exit beam 32 onto a sample, not shown, positioned in sample holder 38. Upon interacting with the sample, in this case upon passing through the sample by transmission, exit beam 32 impinges upon collecting element 40 which directs the beam to a suitable detector 42. It will be appreciated by those in the art that many alternate ways exist for focusing exit beam 32 onto a sample and that the particular means disclosed herein is meant merely for illustration. It will also be appreciated that a sample may be analyzed in modes other than transmission, in particular reflection, and that such optical configurations are known to prior art.

Figure 2:
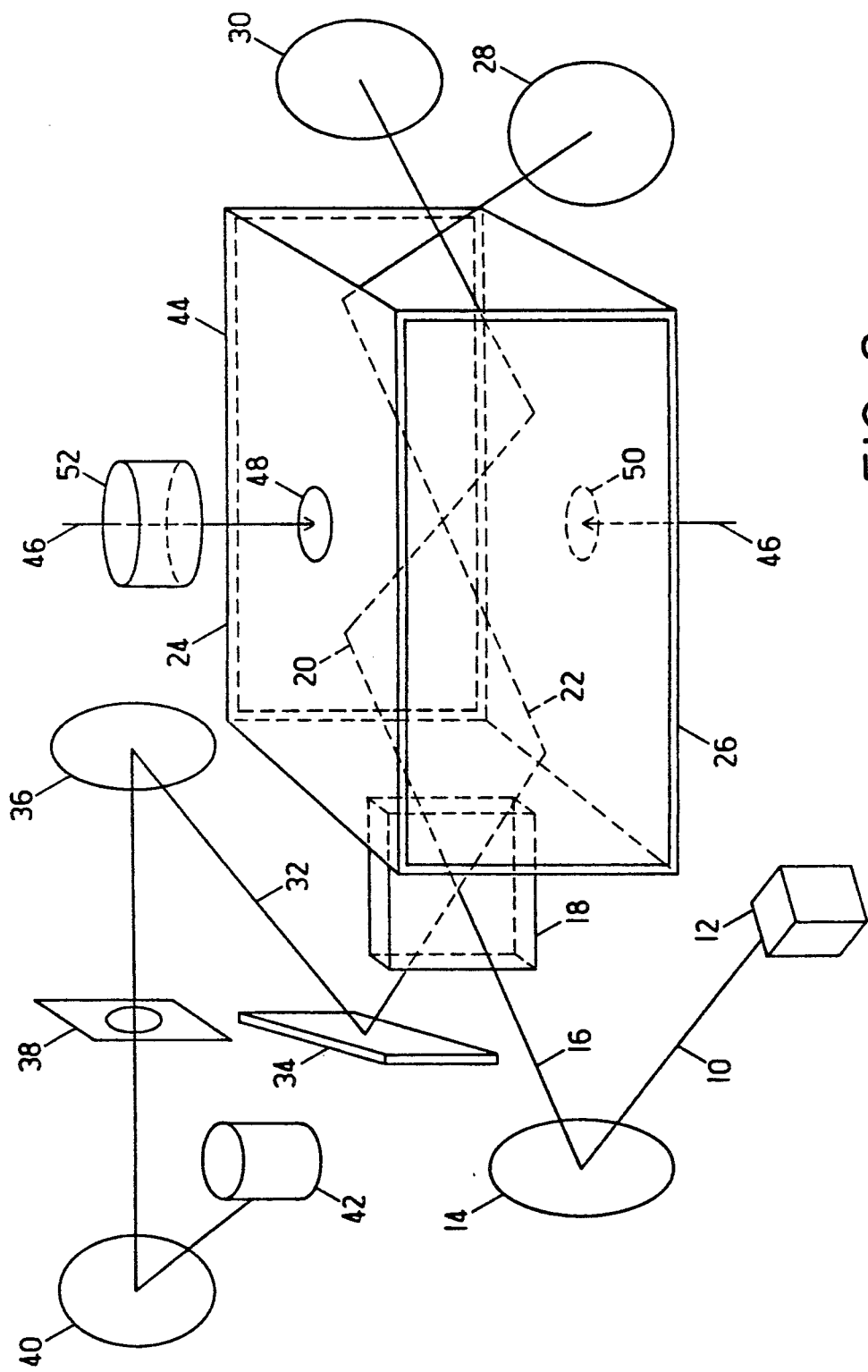
FIG. 2 is a perspective view of the present invention.

Reflecting elements 24 and 26 are mounted in a housing 44 which is disposed to pivot about rotation axis 46. In FIG. 1 this axis is perpendicular to the plane of the figure. FIG. 2 shows a perspective view of the present invention and indicates the bearings 48 and 50 which rotatably support the housing 44. Bearings 48 and 50 are known to the art and preferably comprise zero friction flex pivots, such as those manufactured by the Bendix Corporation. They may alternatively comprise any other kinematically designed pivots, but should be of sufficient quality to provide a repeatable and precise rotation. Rotation of the housing 44 may be effected by the use of a torque motor 52 which is preferably located on the rotation axis 46.

It is preferred that the various optical elements used in practicing the invention be mounted upon standard optical mounts which permit alignment of the elements. Because the elements should not need to be realigned over long periods of time, this substantially rigid mounting may be unnecessary, as some applications may not require the ability to alter the alignment. It has been found empirically, for example, that once the reflecting elements 24 and 26 are made parallel, they could be mounted quite rigidly in housing 44 without making any available means for fine tuning their alignment. Indeed, one of the chief advantages of the present invention over the prior art is the relative stability of the optical alignment over long periods of operation. In some case it may even be preferred to lock alignment is established, and not provide any means for altering this alignment over the life of the instrument. In any event, optical mounts of many varieties are known to prior art.

Figure 3A:
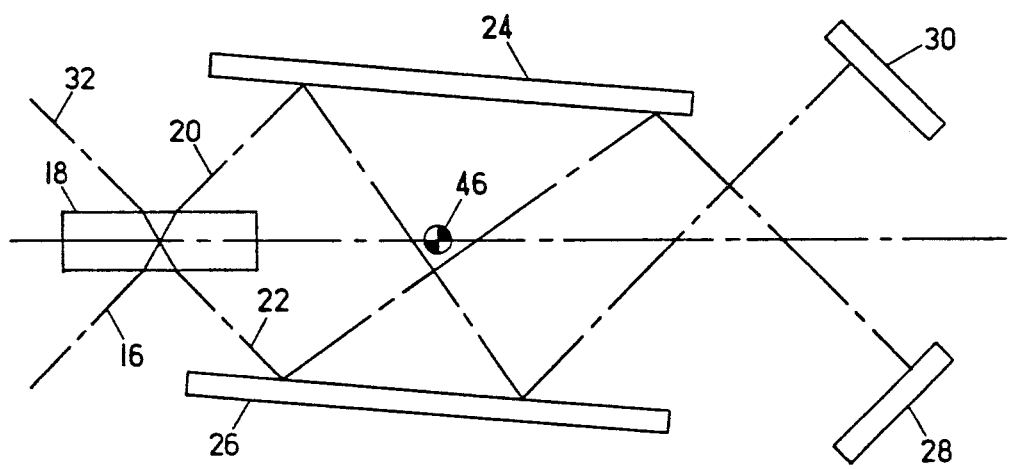
FIG. 3A is a plan view of the tilting reflector assembly in accordance with the present invention.
Figure 3B:
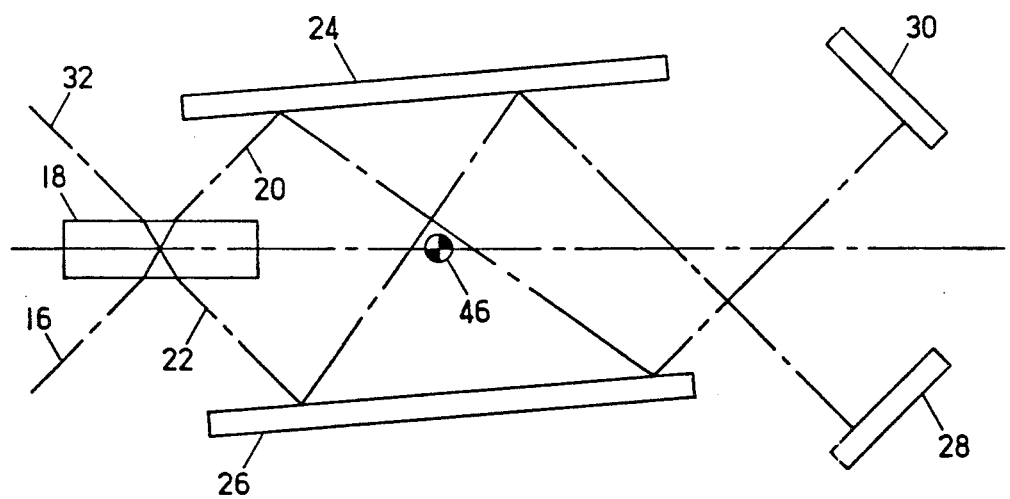
FIG. 3B is a plan view of the tilting reflector assembly showing the reflecting elements 24 and 26 in a portion angularly displaced from the position of these elements as shown in FIG. 3A.

FIG. 3A and 3B shows approximately the manner in which angular displacement of the tilting reflector assembly, composed of housing 44 and paired reflecting elements 24 and 26, varies the path difference of the interferometer. As with other tilting interferometer designs, the relation between path difference and rotation angle may be determined from simple geometrical calculations. It will be appreciated by those in the art that an advantage of the present invention over the prior art is that by varying the length of both arm beams simultaneously, rather than just varying the length of one arm beam, a given path difference between the arms may be achieved with a much smaller rotation of the paired reflecting elements, thus allowing the use of simpler means to achieve the rotation. It will also be appreciated that the symmetrical design is a more stable system, that it is less sensitive to errors produced by thermal expansion, and that it is smaller and more compact than single arm designs. In addition, it is noted that is reflecting elements 24 and 26 are not ideally parallel, that if instead they are askew by a small angle theta, the error in the output beam will remain constant at twice theta during the entire range of tilting of the reflector assembly. Finally, with regard to FIGS. 1, 2, and 3, it is noted that the location of rotation axis 46 is not critical to the effective operation of the invention. In the preferred embodiment the rotation axis 46 is located in the geometric center of the paired reflecting elements 24 and 26, but it should be realized that a rotation about any other parallel axis is equivalent to a rotation about the preferred axis combined with a linear translation; and, as has already been mentioned, the design is insensitive to linear translations.

It is understood that the invention is not confined to the particular embodiments described herein as illustrative, but embraces such forms thereof as come within the scope of the following claims.

I claim:

1. A modulator for modulating the path difference between two arm beams of a twin-arm interferometer, comprising a rotatably supported housing having first and second plane mirrors substantially rigidly attached thereto, wherein the first and second mirrors are mutually facing, have a region between them, and are each substantially parallel to the rotation axis of the rotatably supported housing such that an angular displacement of the rotatably supported housing causes a simultaneous change in the path length of both of the two arm beams.

2. A tilting twin-arm interferometer comprising:
   (a) a first beamsplitter disposed within the path of an inlet beam of electromagnetic radiation, whereby the first beamsplitter splits the inlet beam into a first arm beam and a second arm beam;
   (b) a rotatably supported housing having:
      a first plane mirror disposed within the path of the first arm beam, and
      a second plane mirror disposed within the path of the second arm beam, wherein the first and second mirrors are substantially rigidly attached to the housing, have a region between them, and are substantially parallel to the rotation axis of the housing such that angular displacement of the housing about the rotation axis produces a simultaneous variation in the path length of both arm beams;
   (c) recombination means, disposed within the paths of the first and second arm beams, for recombining the two arm beams to form an exit beam following the interaction of the two arm beams with the first and second mirrors; and
   (d) a detector disposed within the path of the exit beam.

3. The tilting interferometer of claim 2, wherein the recombination means includes first and second retroreflecting elements disposed within the paths of the first and second arm beams, for returning the first and second arm beams to the first beamsplitter.

4. A method of modulating the path difference between two infrared arm beams in a twin arm interferometer, comprising the steps of:
   (a) splitting an inlet infrared beam in a beamsplitter into a first arm beam passed through the beamsplitter and a second arm beam reflected from the beamsplitter;
   (b) reflecting the first arm beam off of a plane mirror across a region to a parallel plane mirror and reflecting the first beam off of that mirror into a retroreflector, and reflecting the first arm beam off of the retroreflector back into the region between the parallel plane mirrors and reflecting the beam off of the plane mirrors along the same path as the incoming first beam back to the beamsplitter;
   (c) reflecting the second arm beam off of a plane mirror across a region to a parallel plane mirror and reflecting the second arm beam off of that mirror into a retroreflector, and reflecting the second arm beam off of the retroreflector back into the region between the parallel plane mirrors along the same path as the incoming second beam back to the beamsplitter;
   (d) combining the reflected first and second beam at the beamsplitter to form an exit beam;
   (e) pivoting the plane mirrors about a rotation axis to vary the path lengths of the first and second arm beams as they are combined at the beamsplitter.

* * * * *

UNITED STATES PATENT AND TRADEMARK OFFICE
CERTIFICATE OF CORRECTION

PATENT NO. : 5,150,172
DATED : September 22, 1992
INVENTOR(S) : Brierley, Philip R.

It is certified that error appears in the above-identified patent and that said Letters Patent is hereby corrected as shown below:

Column 3, lines 14 and 15 "portion" should be --position--.

Column 4, line 28, "case" should be --cases--.

Column 4, line 29, after "preferred to lock" insert --reflecting elements 24 and 26 in place on housing 44, once the initial--.

Signed and Sealed this

Fourteenth Day of September, 1993

Attest:

BRUCE LEHMAN

*Attesting Officer*   *Commissioner of Patents and Trademarks*